United States Patent
Rollings et al.

(10) Patent No.: US 11,037,133 B2
(45) Date of Patent: Jun. 15, 2021

(54) SYSTEM, METHOD, AND COMPUTER PROGRAM PRODUCT FOR SELECTIVELY DISPLAYING INFORMATION REGARDING ACTIVITY IN A GEOGRAPHIC AREA

(71) Applicant: Visa International Service Association, San Francisco, CA (US)

(72) Inventors: Paul Rollings, Wantage (GB); Debesh Kumar, San Mateo, CA (US); Christopher DeMartini, San Carlos, CA (US); Lawson Lau, Palo Alto, CA (US); Guangyu Wang, Danville, CA (US); Zhe Zhang, Alviso, CA (US)

(73) Assignee: Visa International Service Association, San Francisco, CA (US)

( * ) Notice: Subject to any disclaimer, the term of this patent is extended or adjusted under 35 U.S.C. 154(b) by 158 days.

(21) Appl. No.: 16/048,762

(22) Filed: Jul. 30, 2018

(65) Prior Publication Data
US 2020/0034823 A1    Jan. 30, 2020

(51) Int. Cl.
*G06Q 20/34* (2012.01)
*G06F 16/9537* (2019.01)
*G06F 16/29* (2019.01)

(52) U.S. Cl.
CPC ......... *G06Q 20/34* (2013.01); *G06F 16/9537* (2019.01); *G06F 16/29* (2019.01)

(58) Field of Classification Search
CPC .... G06Q 30/0205; G06Q 20/34; G06F 16/29; G06F 16/9537
See application file for complete search history.

(56) References Cited

U.S. PATENT DOCUMENTS

| | | | |
|---|---|---|---|
| 10,102,536 B1 * | 10/2018 | Hickman | G06Q 30/0205 |
| 2008/0059288 A1 * | 3/2008 | Kokernak | G06Q 30/0201 |
| | | | 705/14.41 |
| 2008/0288312 A1 | 11/2008 | Miles et al. | |
| 2010/0076813 A1 | 3/2010 | Ghosh et al. | |
| 2012/0066065 A1 | 3/2012 | Switzer | |
| 2012/0124496 A1 | 5/2012 | Rose et al. | |
| 2013/0332361 A1 | 12/2013 | Ciurea | |
| 2014/0156388 A1 * | 6/2014 | Winters | G06Q 30/0246 |
| | | | 705/14.45 |

(Continued)

*Primary Examiner* — Ryan D Donlon
*Assistant Examiner* — Mark A Malkowski
(74) *Attorney, Agent, or Firm* — The Webb Law Firm

(57) ABSTRACT

Provided is a method for selectively displaying information regarding activity in a geographic area. The method may include receiving data regarding a plurality of card-present payment transactions that have been conducted in the geographic area during a time interval, determining a plurality of segments of the geographic area, assigning each of the transactions to the segment in which the transaction was conducted, determining aggregate transaction data for each of the segments based on data regarding the transactions that have been assigned to that segment; generating a transaction index for each segment based on a comparison of the aggregate transaction data of that segment with aggregate transaction data of at least one different segment and/or least one predetermined metric, and generating a visual representation comprising data regarding the transaction index of at least one of the segments. A system and computer program product are also provided.

12 Claims, 9 Drawing Sheets

(56) References Cited

U.S. PATENT DOCUMENTS

| | | | |
|---|---|---|---|
| 2015/0039912 A1* | 2/2015 | Payton | H04L 9/008 |
| | | | 713/193 |
| 2015/0142515 A1* | 5/2015 | Ghosh | G06Q 30/0202 |
| | | | 705/7.31 |
| 2015/0154641 A1* | 6/2015 | Weiss | G06Q 30/0261 |
| | | | 455/456.3 |
| 2016/0337332 A1* | 11/2016 | Ghosh | G06Q 10/00 |
| 2018/0033023 A1* | 2/2018 | Pereira | G06Q 30/0201 |
| 2018/0240055 A1* | 8/2018 | Theus | G06Q 10/06311 |

\* cited by examiner

450
Determining aggregate transaction data associated with transactions conducted in each of the plurality of segments of the geographic area Geographic Identification System
402

460
Determine a transaction index for each of the plurality of segments of the geographic area based on the aggregate transaction data

SYSTEM, METHOD, AND COMPUTER PROGRAM PRODUCT FOR SELECTIVELY DISPLAYING INFORMATION REGARDING ACTIVITY IN A GEOGRAPHIC AREA

BACKGROUND OF THE INVENTION

1. Field of the Invention

This invention relates generally to systems, devices, products, apparatus, and methods for selectively displaying information regarding activity in a designated geographic area, and, in one particular non-limiting embodiment, to a system, method, and computer program product for generating a privacy-protected map for selectively displaying information regarding commercial activity in a designated geographic area.

2. Technical Considerations

It is generally desirable to place consumer-facing businesses at geographic locations where consumers frequently conduct third party transactions, because this increases consumer exposure to store fronts or advertising materials, which may induce a consumer to patronize the business. Further, it is often desirable to place new franchise locations in geographic locations near places existing customers of the franchise frequently conduct transactions with third parties in order to maximize the exposure of the new location to already-established customers of the franchise.

Transaction service providers are often in possession of large volumes of transaction data, including data regarding the number and amount of transactions that have been conducted with specific merchants at specific geographic locations. Such data could be useful for identifying geographic locations where consumers frequently conduct third party transactions and, thus, for determining a location for placing a consumer-facing business. However, due to privacy concerns, it is often not possible for this transaction data or even limited portions thereof to be communicated to a user who is interested in selecting a location for placing a consumer-facing business.

For example, in some instances, even if the transaction data is scrubbed of identifying information of the merchants or customers, the number and/or volume of third party transactions conducted in a defined geographic area may still be indicative of sensitive or confidential information (e.g., the gross revenue) of an identifiable merchant or group of merchants located therein. This problem may be exacerbated if the transaction data is filtered by merchant category or other like parameters which may reduce the number of merchants.

Accordingly, it would be desirable to provide a means for generating a privacy-protected representation of a geographic area which provides information sufficient to identify geographic locations where a large number of third-party transactions have been conducted but which does not provide information sufficient to determine confidential information regarding particular merchants in those geographic locations.

Further, collecting, processing, and displaying transaction data regarding each and every merchant in a particular geographic area may present a considerable constraint on network resources, and, as previously mentioned, communicating data that is filtered by a merchant category or other like parameters may exacerbate the problem of the transaction data being usable to obtain confidential information regarding merchants in the geographic area. Accordingly, it would be desirable to provide a means for generating a privacy-protected representation of a geographic area which provides information sufficient to identify geographic locations where a large number of third-party transactions in a particular merchant category have been conducted, but which still does not provide information sufficient to determine confidential information regarding particular merchants in those geographic locations.

Further, due to rapidly shifting population demographics in recent years, and, in particular, due to the increased popularity of transient business locations (e.g., "pop-up" bars and restaurants, food trucks, and the like), transaction data for certain geographic areas may rapidly become stale such that it is no longer useful for determining a location for placing a consumer-facing business. As such, in many instances, there is only a very limited amount of time during which the transaction data may be subjected to privacy controls before it can be communicated to a user. Accordingly, it would be desirable to provide a means for generating a privacy-protected representation of a geographic area which provides information sufficient to identify geographic locations where a large number of third-party transactions in a particular merchant category have been conducted, but which still does not provide information sufficient to determine confidential information regarding particular merchants in those geographic locations, and which may be dynamically updated in real time.

In accordance with the present invention, some or all of the above-referenced deficiencies in the art may be solved by a process that includes receiving, by at least one processor, data regarding a plurality of card-present payment transactions that have been conducted in the geographic area during a time interval; determining, by at least one processor, a plurality of segments of the geographic area; assigning, by at least one processor, each of the plurality of card-present payment transactions to the segment corresponding to the segment of the geographic area in which the card-present payment transaction was conducted; determining, by at least one processor, aggregate transaction data for each of the plurality of segments based on data regarding the card-present payment transactions that have been assigned to that segment; generating, by at least one processor, a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof; and generating, by at least one processor, a visual representation comprising data regarding the transaction index of at least one of the plurality of segments.

SUMMARY OF THE INVENTION

Accordingly, and generally, provided is an improved method, system, and computer program product for a system, method, and computer program product for selectively displaying information regarding activity in a designated geographic area.

Clause 1: A method for selectively displaying information regarding activity in a geographic area, comprising: receiving, by at least one processor, data regarding a plurality of card-present payment transactions that have been conducted in the geographic area during a time interval; determining, by at least one processor, a plurality of segments of the geographic area; assigning, by at least one processor, each of the plurality of card-present payment transactions to the segment corresponding to the segment of the geographic area in which the card-present payment transaction was conducted; determining, by at least one processor, aggregate transaction data for each of the plurality of segments based on data regarding the card-present payment transactions that have been assigned to that segment; generating, by at least one processor, a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof; and generating, by at least one processor, a visual representation comprising data regarding the transaction index of at least one of the plurality of segments.

Clause 2. The method of clause 1, further comprising: determining, for at least one segment of the plurality of segments of the geographic area and based on receiving the data regarding the plurality of card-present payment transactions, data regarding a total number and/or total amount of transactions in which each of at least one merchant located in the at least one segment was involved during the time interval; and determining, by at least one processor, whether the at least one segment is an enhanced privacy protection requiring segment based on determining whether the fraction of the aggregate transaction data of the at least one segment that is attributable to at least one of the at least one merchant exceeds a threshold.

Clause 3. The method of any of clauses 1 or 2, further comprising: identifying, for each enhanced privacy protection requiring segment, at least one analogous segment, the at least one analogous segment, comprising a segment of the geographic area having at least one of the following characteristics: a predetermined geographic relationship with the privacy protection requiring segment, an aggregate transaction data falling within a specified range of the aggregate transaction data of the privacy protection requiring segment, or any combination thereof, wherein generating the visual representation comprising data regarding the transaction index of at least one of the plurality of segments comprises displaying, for each privacy protection requiring segment, data regarding a masked transaction index, the masked transaction index being generated based on an average of the transaction indexes of the privacy protection requiring segment and the transaction indexes of the at least one analogous segment.

Clause 4. The method of any of clauses 1-3, wherein the visual representation is generated by at least a second processor, the at least second processor not having access to the transaction data or the aggregate transaction data.

Clause 5. The method of any of clauses 1-4, wherein the at least second processor does not have access to the transaction index for the enhanced privacy protection requiring segments.

Clause 6. The method of any of clauses 1-5, wherein determining a plurality of segments of a geographic area comprises generating a grid overlayed on a representation of the geographic area, the grid comprising a plurality of subunits, each subunit corresponding to one of the plurality of segments.

Clause 7. The method of any of clauses 1-6, further comprising: receiving, by at least one processor, data regarding a plurality of customers that have previously completed transactions with a user; and excluding, from the plurality of card-present payment transactions, transactions that do not involve at least one of the plurality of customers that have previously completed transactions with the user.

Clause 8. A system for selectively displaying information regarding activity in a geographic area, comprising at least one processor configured or programmed to: receive data regarding a plurality of card-present payment transactions that have been conducted in the geographic area during a time interval; determine a plurality of segments of the geographic area; assign each of the plurality of card-present payment transactions to the segment corresponding to the segment of the geographic area in which the card-present payment transaction was conducted; determine aggregate transaction data for each of the plurality of segments based on data regarding the card-present payment transactions that have been assigned to that segment; generate a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof; and generate a visual representation comprising data regarding the transaction index of at least one of the plurality of segments.

Clause 9. The system of clause 8, wherein the at least one processor is further configured or programmed to: determine, for at least one segment of the plurality of segments of the geographic area and based on receiving the data regarding the plurality of card-present payment transactions, data regarding a total number and/or total amount of transactions in which each of at least one merchant located in the at least one segment was involved during the time interval; and determine whether the at least one segment is an enhanced privacy protection requiring segment based on determining whether the fraction of the aggregate transaction data of the at least one segment that is attributable to at least one of the at least one merchant exceeds a threshold.

Clause 10. The system of clauses 8 or 9, wherein the at least one processor is further configured or programmed to: identify, for each enhanced privacy protection requiring segment, at least one analogous segment, the at least one analogous segment, comprising a segment of the geographic area having at least one of the following characteristics: a predetermined geographic relationship with the privacy protection requiring segment, an aggregate transaction data falling within a specified range of the aggregate transaction data of the privacy protection requiring segment, or any combination thereof, wherein generating the visual representation comprising data regarding the transaction index of at least one of the plurality of segments comprises displaying, for each privacy protection requiring segment, data regarding a masked transaction index, the masked transaction index being generated based on an average of the transaction indexes of the privacy protection requiring segment and the transaction indexes of the at least one analogous segment.

Clause 11. The system of any of clauses 8-10, wherein the at least one processor comprises at least a second processor configured or programmed to generate the visual representation, wherein the at least second processor does not have access to the transaction data or the aggregate transaction data.

Clause 12. The system of any of clauses 8-11, wherein the at least second processor does not have access to the transaction index for the enhanced privacy protection requiring segments.

Clause 13. The system of any of clauses 8-12, wherein determining a plurality of segments of a geographic area comprises generating a grid overlayed on a representation of the geographic area, the grid comprising a plurality of subunits, each subunit corresponding to one of the plurality of segments.

Clause 14. The system of any of clauses 8-13, wherein the at least one processor is further configured or programmed to: receive data regarding a plurality of customers that have previously completed transactions with a user; and exclude, from the plurality of card-present payment transactions, transactions that do not involve at least one of the plurality of customers that have previously completed transactions with the user.

Clause 15. A computer program product for selectively displaying information regarding activity in a geographic area, the computer program product comprising at least one non-transitory computer-readable medium comprising program instructions that, when executed by the at least one processor, cause the at least one processor to: receive data regarding a plurality of card-present payment transactions that have been conducted in the geographic area during a time interval; determine a plurality of segments of the geographic area; assign each of the plurality of card-present payment transactions to the segment corresponding to the segment of the geographic area in which the card-present payment transaction was conducted; determine aggregate transaction data for each of the plurality of segments based on data regarding the card-present payment transactions that have been assigned to that segment; generate a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof; and generate a visual representation comprising data regarding the transaction index of at least one of the plurality of segments.

Clause 16. The computer program product of clause 15, wherein the at least one non-transitory computer-readable medium further comprises program instructions that, when executed by at least one processor, cause the at least one processor to: determine, for at least one segment of the plurality of segments of the geographic area and based on receiving the data regarding the plurality of card-present payment transactions, data regarding a total number and/or total amount of transactions in which each of at least one merchant located in the at least one segment was involved during the time interval; and determine whether the at least one segment is an enhanced privacy protection requiring segment based on determining whether the fraction of the aggregate transaction data of the at least one segment that is attributable to at least one of the at least one merchant exceeds a threshold.

Clause 17. The computer program product of clauses 15 or 16, wherein the at least one non-transitory computer-readable medium further comprises program instructions that, when executed by at least one processor, cause the at least one processor to: identify, for each enhanced privacy protection requiring segment, at least one analogous segment, the at least one analogous segment, comprising a segment of the geographic area having at least one of the following characteristics: a predetermined geographic relationship with the privacy protection requiring segment, an aggregate transaction data falling within a specified range of the aggregate transaction data of the privacy protection requiring segment, or any combination thereof, wherein generating the visual representation comprising data regarding the transaction index of at least one of the plurality of segments comprises displaying, for each privacy protection requiring segment, data regarding a masked transaction index, the masked transaction index being generated based on an average of the transaction indexes of the privacy protection requiring segment and the transaction indexes of the at least one analogous segment.

Clause 18. The computer program product of any of clauses 15-17, wherein the at least one processor comprises at least a second processor, wherein the at least one non-transitory computer-readable medium further comprises program instructions that, when executed by the at least second processor, cause the at least second processor to generate the visual representation, wherein the at least second processor does not have access to the transaction data or the aggregate transaction data, and wherein the at least second processor does not have access to the transaction index for the enhanced privacy protection requiring segments.

Clause 19. The computer program product of any of clauses 15-18, wherein determining a plurality of segments of a geographic area comprises generating a grid overlayed on a representation of the geographic area, the grid comprising a plurality of subunits, each subunit corresponding to one of the plurality of segments.

Clause 20. The computer program product of any of clauses 15-19, wherein the at least one non-transitory computer-readable medium further comprises program instructions that, when executed by the at least one processor, cause the at least one processor to: receive data regarding a plurality of customers that have previously completed transactions with a user; and exclude, from the plurality of card-present payment transactions, transactions that do not involve at least one of the plurality of customers that have previously completed transactions with the user.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying figures, in which.

DESCRIPTION OF THE INVENTION

Figure 1:
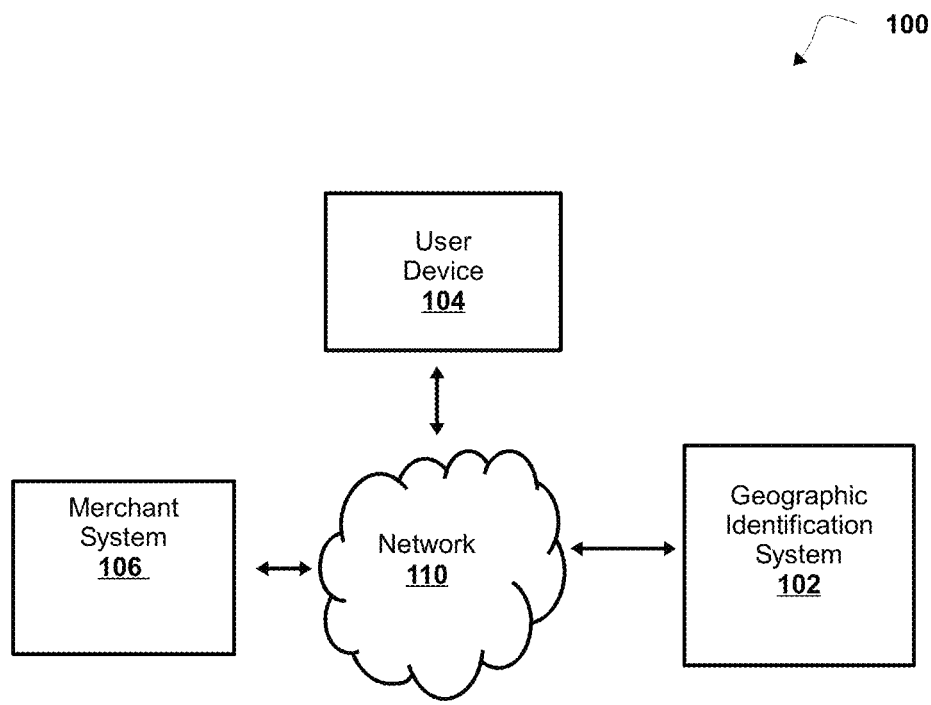
FIG. 1 is a diagram of a non-limiting embodiment of an environment in which systems, devices, products, apparatus, and/or methods, described herein, may be implemented.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa® or any other entity, that processes transactions.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like), such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system" or "point-of-sale (POS) device" as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "computing device" may refer to one or more electronic devices that are configured to directly or indirectly communicate with or over one or more networks. The computing device may include a computer, a desktop computer, a server, a client device, a mobile device, and/or the like. As an example, a mobile device may include a cellular phone (e.g., a smartphone or standard cellular phone), a portable computer, a wearable device (e.g., watches, glasses, lenses, clothing, and/or the like), a PDA, and/or other like devices. An "application" or "application program interface" (API) may refer to software or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "server" may refer to one or more computing devices that are operated by or facilitates communication and processing for multiple parties (e.g., multiple computing devices) via a network (e.g., a public network, a private network, the Internet, and/or the like). In some non-limiting embodiments, multiple computing devices (e.g., computers, servers, and/or the like) directly or indirectly communicating in the network environment may constitute a "system." In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "client device," as used herein, may refer to one or more computing devices that are configured to communicate with one or more servers via a network. In some non-limiting embodiments, a client device may include a device and/or a system configured to communicate with another device and/or another system that is remote from the client device (e.g., that is connected to a network that is different from the network to which the client device is connected).

Referring now to FIG. 1, FIG. 1 is a diagram of an example environment 100 in which devices, systems, and/or methods, described herein, may be implemented. As shown in FIG. 1, environment 100 includes geographic identification system 102, user device 104, merchant system 106, and network 110. Geographic identification system 102, user device 104, and/or merchant system 106 may interconnect (e.g., establish a connection to communicate) via wired connections, wireless connections, or a combination of wired and wireless connections.

Geographic identification system 102 may include one or more devices capable of receiving information from and/or communicating information to user device 104 and/or merchant system 106 via network 110. For example, geographic identification system 102 may include a computing device, such as a server, a group of servers, and/or other like devices. In some non-limiting embodiments, geographic identification system 102 may be associated with a transaction service provider and/or an issuer institution as described herein. In some non-limiting embodiments, geographic identification system 102 may be in communication with a data storage device, which may be local or remote to the geographic identification system 102. In some non-limiting embodiments, geographic identification system 102 may be capable of receiving information from, storing information in, communicating information to, or searching information stored in data storage device.

User device 104 may include one or more devices capable of receiving information from and/or communicating information to geographic identification system 102 and/or merchant system 106 via network 110. For example, user device 104 may include a client device and/or the like. In some non-limiting embodiments, user device 104 may or may not be capable of receiving information (e.g., from merchant system 106, from a remote system, and/or the like) via a short-range wireless communication connection (e.g., an NFC communication connection, an RFID communication connection, a Bluetooth® communication connection, and/or the like), and/or communicating information (e.g., to geographic identification system 102, merchant system 106, to a remote system, and/or the like) via a short-range wireless communication connection. In some non-limiting embodiments, user device 104 may be associated with a user, such as an entrepreneur, a prospective entrepreneur, a franchisor, a business developer, or similar entity which may be seeking to determine an appropriate location for placing a new storefront or which may otherwise have an interest in identifying geographic areas having a high volume of economic activity but which may not be authorized to receive confidential information regarding existing merchants in the geographic areas.

Merchant system 106 may include one or more devices capable of receiving information from and/or communicating information to geographic identification system 102 and/or user device 104 via network 110. Merchant system 106 may also include a device capable of receiving information from geographic identification system 102 and/or user device 104 via network 110, a communication connection (e.g., an NFC communication connection, an RFID communication connection, a Bluetooth® communication connection, and/or the like) with geographic identification system 102, user device 104, and/or the like, and/or communicating information to geographic identification system 102 and/or user device 104 via network 110, the communication connection, and/or the like. In some non-limiting embodiments, merchant system 106 may include a computing device, such as a server, a group of servers, a client device, a group of client devices, and/or other like devices. In some non-limiting embodiments, merchant system 106 may be associated with a merchant, as described herein. In some non-limiting embodiments, merchant system 106 may include one or more user devices 104. For example, merchant system 106 may include user device 104 that allows a merchant to communicate information to geographic identification system 102. In some non-limiting embodiments, merchant system 106 may include one or more devices, such as computers, computer systems, and/or peripheral devices capable of being used by a merchant to conduct a transaction with a user. For example, merchant system 106 may include a POS device and/or a POS system.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
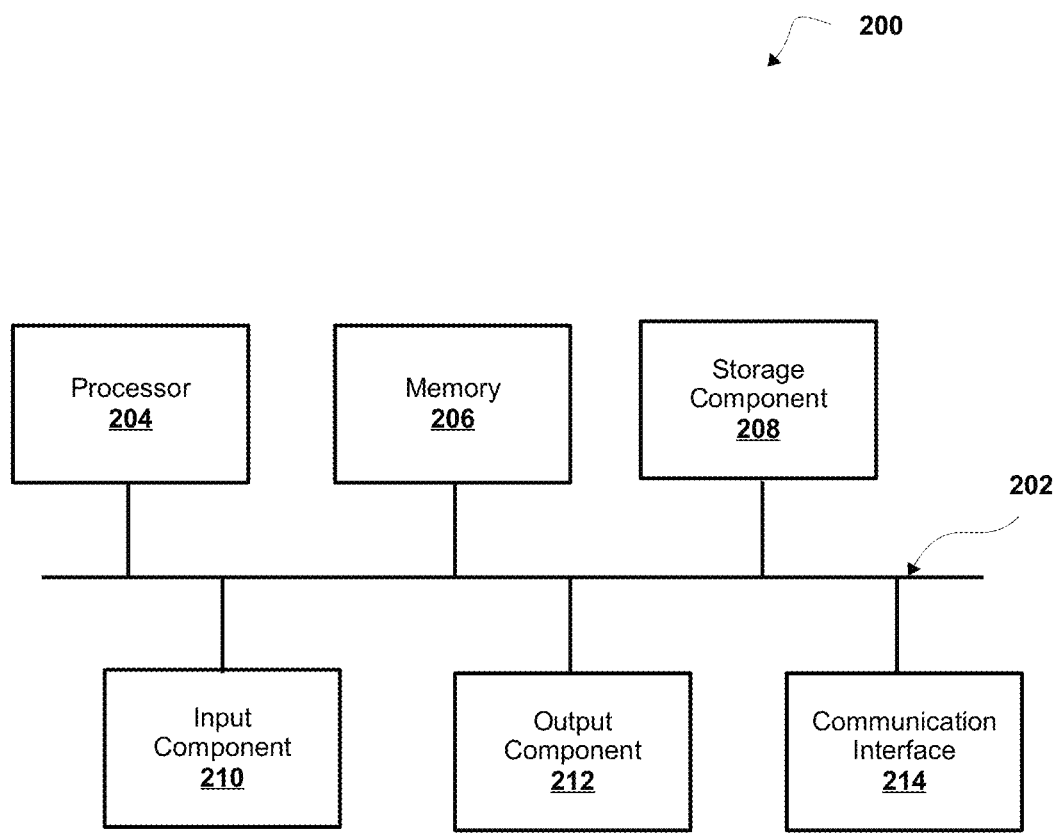
FIG. 2 is a diagram of a non-limiting embodiment of components of one or more devices of FIG. 1.

FIG. 2 is a diagram of example components of device 200. Device 200 may correspond to one or more devices of geographic identification system 102, and/or one or more devices of user device 104, and/or one or more devices of merchant system 106. In some non-limiting embodiments, geographic identification system 102, user device 104, and/or merchant system 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include a random access memory (RAM), a read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Non-limiting embodiments of the present invention are directed to systems, methods, and computer program products for generating a privacy-protected map for selectively displaying information regarding commercial activity in a designated geographic area. For example, non-limiting embodiments of the present invention provide for a means for generating a privacy-protected representation of a geographic area which provides information sufficient to identify geographic locations where a large number of third-party transactions have been conducted but which does not provide information sufficient to determine confidential information regarding particular merchants in those geographic locations and which may be dynamically updated in real time.

Figure 3:
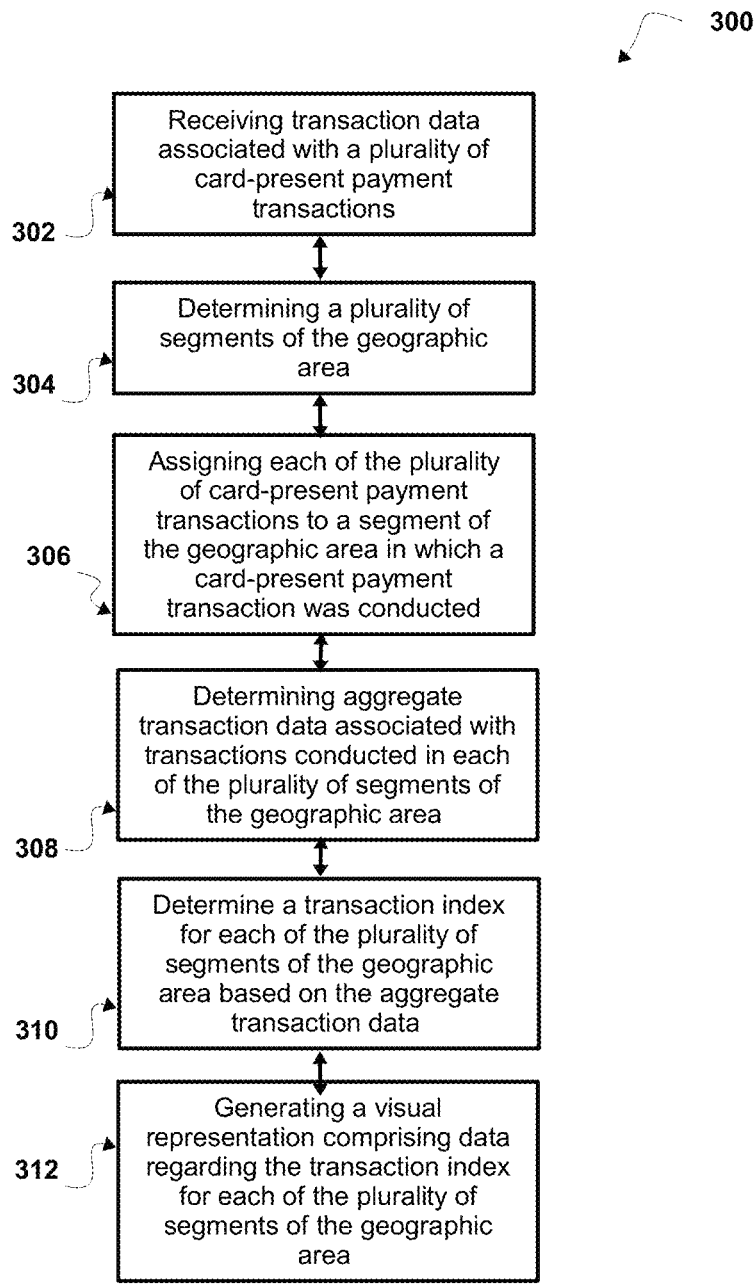
FIG. 3 is a flow diagram of a method for selectively displaying information regarding activity in a geographic area.

Referring now to FIG. 3, FIG. 3 is a flowchart of a non-limiting embodiment of process 300 for generating a privacy-protected map for identifying locations having a high volume of economic activity. In some non-limiting embodiments, one or more of the steps of process 300 may be performed (e.g., completely, partially, etc.) by geographic identification system 102 (e.g., one or more devices of geographic identification system 102). In some non-limiting embodiments, one or more of the steps of process 300 may be performed (e.g., completely, partially, etc.) by another device or a group of devices separate from or including geographic identification system 102, such as user device 104 or merchant system 106 (e.g., one or more devices of merchant system 106).

As shown in FIG. 3, at step 302, process 300 includes, receiving transaction data associated with a plurality of card-present payment transactions. For example, geographic identification system 102 may receive transaction data associated with a plurality of card-present payment transactions involving (e.g., conducted by) a customer, a plurality of customers, and/or the like. In some non-limiting embodiments, the transaction data may be associated with a plurality of payment transactions involving one or more accounts (e.g., a credit card account, a debit card account, and/or the like) associated with a customer, a plurality of accounts of a plurality of customers, and/or the like. In some non-limiting embodiments, the transaction data may be associated with a plurality of payment transactions involving one or more debit accounts of a plurality of customers independent of a plurality of payment transactions involving one or more credit accounts of the plurality of customers.

In some non-limiting embodiments, geographic identification system 102 may receive the transaction data from user device 104 and/or merchant system 106 (e.g., via network 110). For example, geographic identification system 102 may receive the transaction data from merchant system 106 via network 110 in real-time while a payment transaction is being conducted, after a payment transaction has been authorized, after a payment transaction has been cleared, and/or after a payment transaction has been settled. In some non-limiting embodiments, historical transaction data may include transaction data associated with one or more payment transactions that have been authorized, cleared, and/or settled.

In some non-limiting embodiments, the transaction data may be associated with a payment transaction (e.g., a payment transaction of a plurality of payment transactions) and/or a plurality of payment transactions. For example, the transaction data may be associated with a payment transaction involving a customer and a merchant (e.g., a merchant associated with merchant system 106). In some non-limiting embodiments, the plurality of payment transactions may involve a plurality of customers and a plurality of merchants, and each payment transaction of the plurality of payment transactions may involve a single customer and a single merchant.

In some non-limiting embodiments, the transaction data associated with a payment transaction may include transaction amount data associated with an amount of the payment transaction (e.g., a cost associated with the payment transaction, a transaction amount, an overall transaction amount, a cost of one or more products involved in the payment transaction, and/or the like), transaction time data associated with a time interval at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., a card present transaction, a face-to-face transaction, and/or the like), and/or the like.

Additionally or alternatively, the transaction data may include customer transaction data associated with the customer involved in the payment transaction and/or merchant transaction data associated with the merchant involved in the payment transaction. In some embodiments, customer transaction data may include customer identity data associated with an identity of the customer (e.g., a unique identifier of the customer, a name of the customer, and/or the like), customer account data associated with an account of the customer (e.g., an account identifier associated with the customer, a PAN associated with a credit and/or debit account of the customer, a token associated with a credit and/or debit account of the customer, and/or the like), customer location data associated with a location of a customer (e.g., customer location data associated with a geographic area in which a customer resides, customer location data associated with a billing zip code of an account of a customer, and/or the like), and/or the like.

In some embodiments, merchant transaction data may include merchant identity data associated with an identity of a merchant (e.g., merchant identity data associated with a unique identifier of a merchant, merchant identity data associated with a name of a merchant, and/or the like), merchant category data associated with at least one merchant category of a merchant (e.g., merchant category data associated with a code for at least one merchant category of a merchant, merchant category data associated with a name of a merchant category of a merchant, merchant category data associated with a type of a merchant category of a merchant, and/or the like), merchant account data associated with an account of a merchant (e.g., merchant account data associated with an account identifier of an account of a merchant, merchant account data associated with a PAN regarding an account of a merchant, merchant account data associated with a token regarding an account of a merchant, and/or the like), merchant location data associated with a location of a merchant (e.g., merchant location data associated with a geographic area in which a location of a merchant is located, and/or the like), and/or the like.

In some non-limiting embodiments, transaction data associated with a payment transaction (e.g., each payment transaction of a plurality of payment transactions) may identify a merchant category of a merchant involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments, a payment transaction may involve a merchant that is associated with a merchant category of a plurality of merchant categories.

In some non-limiting embodiments, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time interval at which the payment transaction occurred.

In some non-limiting embodiments, geographic identification system 102 may limit the received transaction data associated with a plurality of card-present payment transactions in the geographic area to data regarding transactions associated with an identified subset of merchants and/or may filter out transaction data regarding merchants who have conducted card-present transactions in the designated geographic area, but do not fall into the identified subset. For example, geographic identification system 102 may retrieve transaction data associated only with merchants in a certain merchant category (e.g., restaurants, grocery stores, movie theaters, car dealerships, etc.), merchants who have engaged within a certain range of an acceptable number of transactions during a time interval, merchants having an average per-transaction value within an identified range, and/or the like. For example, geographic identification system 102 may retrieve the transaction data associated with a plurality of card-present payment transactions in response to a request from a user (e.g., a user associated with user device 104) who has previously engaged in transactions with a plurality of customers who may or may not be located in the vicinity of the designated geographic area. For example, geographic identification system 102 may receive a request from a user device associated with an entrepreneur, a prospective entrepreneur, a franchisor, a business development entity, and/or the like, who has already engaged in transactions with customers who may or may not frequent the designated geographic area and is interested in placing a store front in the geographic area. For example, geographic identification system 102 may determine which transaction data associated with a plurality of card-present payment transactions that is retrieved, based on customer transaction data for each of the transactions, such that only the data associated with customers that have already previously engaged in transactions with the user is retrieved. Additionally or alternatively, geographic identification system 102 may filter out transaction data involving customers that have not previously engaged in transactions with the user. In this way, network resources may be conserved by limiting the data that is required to be transmitted, processed, and/or analyzed to only that for the most relevant types of merchants and such that the resulting visual representation that is to be generated may be further tailored to the needs of the requesting user.

As shown in FIG. 3, at step 304, process 300 includes determining a plurality of segments of a geographic area. In some non-limiting embodiments, geographic identification system 102 and/or user device 104 may be designed to receive as an input a request to generate a map of a designated geographic area and to retrieve geographic data (e.g., from an internal database and/or via network 110) corresponding to the designated geographic area, which geographic identification system 102 may then use as a basis for generating a map of the designated geographic area.

In some non-limiting embodiments, geographic identification system 102 may be configured to divide the map into a plurality of segments for further analysis. For example, geographic identification system 102 may generate a grid (e.g., a Cartesian grid, a polar grid, a hexagonal grid, a polygonal grid, etc.) overlayed on the representation of the geographic area where each section of the grid corresponds to one of the plurality of segments. For example, geographic identification system 102 may generate a Cartesian grid having a plurality of grid squares overlayed on the representation of the geographic area, and each of these grid squares may be identified as one of the plurality of segments. For example, geographic identification system 102 may generate a dynamic grid overlayed on the representation of the geographic area where the size of each grid square may be designated by a user input communicated to geographic identification system 102 (e.g., from user device 104 through network 110), such that the size and content of each of the plurality of segments may be adjusted in real time. For example, geographic identification system 102 may be configured to accept an input of the size of each grid square (e.g., 0.1×0.1 mile, 0.5×0.5 mile, 1×1 mile, 5×5 mile, etc.) such that the specificity of the resulting visual representation may be adjusted, e.g., in response to a user request.

In some non-limiting embodiments, geographic identification system 102 and/or user device 104 may be configured to divide the geographic area into a plurality of segments based on map data which includes pre-defined geographic regions (e.g., zip codes, zoning units, political boundary lines, etc.) and to identify each of the pre-defined geographic regions as one of the plurality of segments. In some non-limiting embodiments, a user may set specific parameters for defining a plurality of segments of the geographic area and/or may communicate information for determining the boundaries of one or more of the plurality of segments of the geographic area to geographic identification system 102 (e.g., via user device 104 via network 110).

As shown in FIG. 3, at step 306, process 300 includes assigning each of the plurality of card-present payment transactions to a segment of the geographic area in which the card-present payment transaction was conducted. In some non-limiting embodiments, geographic identification system 102 and/or user device 104 may determine the geographic location of the merchant involved in each card-present payment transaction based on merchant transaction data received as part of the transaction data in step 302 and may then assign each card-present payment transaction to the segment of the representation of the geographic area which corresponds to the location of the merchant. For example, geographic identification system 102 may retrieve map data which includes the locations of a plurality of merchants in the geographic area and may match those locations to merchant data received as part of the transaction data. For example, geographic identification system 102 may use map generation software to plot the location of the merchant on the map of the geographic area. In some non-limiting embodiments, once the geographic location of each merchant has been ascertained by geographic identification system 102, it is assigned to the segment of the geographic area that corresponds to that geographic location.

As shown in FIG. 3, at step 308, process 300 includes determining aggregate transaction data associated with transactions conducted in each of the plurality of segments of the geographic area. In some non-limiting embodiments, the aggregate transaction data is determined (e.g., by geographic identification system 102) by aggregating at least one parameter relating to the card-present payment transactions that have been conducted in the geographic area during the time period and which may be determined based on the transaction data. For example, in some non-limiting embodiments, the aggregate transaction data may comprise or consist of: a total value of card-present payment transactions, a total number of card-present payment transactions, a total number of unique customer accounts that were involved in at least a threshold number of card-present payment transactions during the time interval (e.g., at least one, at least two, etc.), a total number of card-present payment transactions falling within predetermined parameters (e.g. having a predetermined customer category, a predetermined merchant category, an average transaction amount falling within a predetermined range, etc.), or any combination thereof.

As shown in FIG. 3, at step 310, process 300 includes determining a transaction index for each of the plurality of segments of the geographic area based on the aggregate transaction data. In some non-limiting embodiments, the transaction index generated for each of the plurality of segments may comprise or consist of an indicator of a difference between the aggregate transaction data for that segment and the aggregate transaction for at least one other segment. For example, geographic identification system 102 may generate the transaction index for a given segment based on a comparison of the aggregate transaction data for that segment with the aggregate transaction data for each of the other identified segments of the plurality of the geographic area. For example, the transaction index may be generated based on a weighted or unweighted percentile ranking, numerical ranking, or other ranking of the aggregate transaction data for the given segment among the plurality of segments.

Additionally or alternatively, the transaction index generated for each of the plurality of segments may comprise or consist of an indicator of a difference between the aggregate transaction data for that segment and a predetermined metric. For example, geographic identification system 102 may generate the transaction index for a given segment based on a comparison of the aggregate transaction data for that segment and a predetermined or contemporaneously determined threshold value. In some non-limiting embodiments, the threshold may be inputted to or generated by geographic identification system 102 and/or user device 104. In some non-limiting embodiments, the threshold value may be determined based on aggregate transaction data for a comparable geographic area (i.e., a geographic area other than the geographic area that has been designated), such as a geographic area where the user or other interested entity already has a place of business. In some non-limiting examples, the threshold value may be assigned arbitrarily or may be based on a calculated and/or empirically determined metric, e.g., a minimum or maximum total number or amount of transactions in a segment of that size where a merchant of an identified type is predicted to be successful.

As shown in FIG. 3, at step 312, process 300 includes generating a visual representation comprising data regarding the transaction index for each of the plurality of segments of the geographic area. In some non-limiting embodiments, geographic identification system 102 and/or user device 104 may transform the transaction index for each of the plurality of segments into a visual representation thereof based on a discrete or continuous scale and cause this visual representation to be displayed on a graphical user interface, e.g., as part of a map for selectively displaying information regarding commercial activity in a geographic area. For example, the transaction index may be transformed into a visual representation using a continuous scale that is representative of the transaction index and which may be visualized, for example, a color gradient scale (e.g., a red-to-yellow-to-green color scale) or a value gradient scale (e.g., a light to dark value scale). Additionally or alternatively, the transaction index may be displayed numerically or be transformed into a discrete scale where individual characters are assigned to different ranges of possible transaction indexes (e.g., a numeric scale, an alphanumeric scale, a symbol-based scale, etc.).

In some non-limiting embodiments, the visual representation may be displayed on as part of a map on a graphical user interface. For example, a map may be generated which depicts the designated geographic area and which has a grid overlayed thereon, where each subunit (e.g., a "grid square" or other-shaped grid subunit) represents one or more of the plurality of segments. In some non-limiting embodiments, the visual representation may be generated dynamically. For example, geographic identification system 102 and/or user device 104 may be configured to accept and input from a user which relates to a desired size of each of the plurality of segments and to automatically calculate transaction indexes for the re-sized segments and to transform the recalculated indexes into visual representations thereof. For example, geographic identification system 102 and/or user device 104 may be configured to adjust the size of each subunit of a grid overlayed on a map of a geographic area as a user zooms in and out of a map containing at least a portion of the geographic area.

In some non-limiting embodiments, segments of the geographic area that require enhanced privacy protection may be identified, e.g., by geographic identification system 102, based on the transaction data that has been received for each segment, and generating the visual representation may comprise masking or otherwise applying privacy protections to data regarding the transaction index and/or aggregate transaction data. For example, a segment where there are fewer than a threshold number of unique merchants (e.g., fewer than 2, 5, or 10, etc. unique merchants, etc.) may be designated as a geographic segment which requires enhanced privacy protection. For example, a segment where there were fewer than a threshold number of unique customers (e.g., fewer than 2, 5, or 10, etc. unique customers, etc.) involved in transactions during the time interval may be designated as a geographic segment which requires enhanced privacy protection. For example, a segment where fewer than a threshold number of merchants or groups of merchants was involved in more than a threshold portion of the transaction volume for that segment may be designated as a segment which requires enhanced privacy protection (e.g., where fewer than 2, 3, or 5, etc. merchants or groups of merchants is accountable for, e.g., more than 25%, 50%, or 75%, etc. of the transaction volume).

In some non-limiting embodiments, for segments requiring enhanced privacy protection, the transaction index may be masked prior to or contemporaneously with generating the visual representation (e.g., by geographic identification system 102), such that only a masked transaction index is ascertainable from the visual representation itself and/or such that the data which the visual representation is generated based upon (e.g., which is to be provided to user device 104 by geographic identification system 102 via network 110) contains only masked transaction indexes for enhanced privacy protection requiring segments. For example, in non-limiting embodiments, geographic identification system 102 may substitute the transaction index for an enhanced privacy protection requiring segment with a masked transaction index prior to or contemporaneously with communicating the data for generating the visual representation to user device 104. In this way, a user who has access to the visual representation and/or the data which the visual representation is generated based upon but who does have access to the initially collected transaction data (e.g., a user who has access to user device 104 but not geographic identification system 102) may be prevented from determining confidential information regarding the enhanced privacy protection requiring segments.

In some non-limiting embodiments, the masked transaction index may be determined (e.g., by geographic identification system 102) based on the transaction indexes for one or more segments of the geographic area which have been designated as analogous segments. In some non-limiting embodiments, the analogous segments may be designated based on geographic proximity to the enhanced privacy protection requiring segment (e.g., such that segments that are adjacent to or within a threshold radius or number of grid units of the enhanced privacy protection requiring segment are determined as analogous segments). In some non-limiting embodiments, each segment of the geographic area may be ranked by the number of transactions that occurred therein (e.g., in terms of a percentile by geographic identification system 102), and segments that fall within a threshold range (e.g., within 0.1, 0.5, 1, or 5, etc. percentile) may be identified as analogous segments.

In some non-limiting embodiments, the masked transaction index for the enhanced privacy protection requiring segment may be represented as a weighted or non-weighted average of the analogous segments or as a weighted or non-weighted average of the enhanced privacy protection requiring segment itself and the analogous segments. In this way, for example, if the analogous segments are identified in terms of proximity, a user who has access to the visual representation and/or the data for generating the visual representation but not to the initially collected transaction data (e.g., a user who has access to user device 104 but not geographic identification system 102) may be prevented from determining confidential information regarding individual enhanced privacy protection requiring segments but may still be able to determine more general information regarding a number or volume of transactions that have been conducted in a larger area, which includes an enhanced privacy protection requiring segment.

In some non-limiting embodiments, the transaction index for the analogous segments may also be masked, even if they would not otherwise require enhanced privacy protection. For example, each transaction index for the privacy protection requiring segment and each analogous segment may be replaced with the same masked transaction index which is represented as a weighted or non-weighted average of the enhanced privacy protection requiring segment itself and the analogous segments. This may prevent a user who has access to the visual representation and/or the data upon which the visual representation is based but not to the initially collected transaction data (e.g., a user who has access to user device 104 but not geographic identification system 102) from even identifying which segments of the geographic area have been identified as requiring enhanced privacy protection.

In some non-limiting embodiments, where the masked transaction index is generated based on the transaction indexes for a plurality of analogous segments, the masked transaction index itself may be analyzed (e.g., by geographic identification system 102) to determine if even further privacy protections are required and may be further substituted with a double masked, triple masked, etc. transaction index. For example, in particular, when the masked transaction index is represented as a weighted or non-weighted average of a plurality of segments (e.g., the enhanced privacy protection requiring segment and one or more analogous segments), geographic identification system 102 may evaluate the plurality of segments as a group to determine whether even further protections are required. For example, a plurality of segments where there are fewer than a threshold number of unique merchants (e.g., fewer than 2, 5, or 10, etc. unique merchants) may be designated as requiring even further privacy protection. For example, a plurality of segments where there were fewer than a threshold number of unique customers (e.g., fewer than 2, 5, or 10, etc. unique customers) involved in transactions during the time interval may be designated as requiring even further privacy protection. For example, a plurality of segments where fewer than a threshold number of merchants or groups of merchants was involved in more than a threshold portion of the total number or amount of transactions for that segment may be designated as requiring even further privacy protection (e.g., where fewer than 2, 3, or 5, etc. merchants or groups of merchants is accountable for, e.g., more than 25%, 50%, or 75%, etc. of the total number of transactions or amount of transactions).

In some non-limiting embodiments, when a plurality of analogous segments used to generate a masked transaction index is determined to require even further privacy protection (e.g., by geographic identification system 102), further analogous segments may be identified (e.g., by broadening the requisite distance from the original enhanced privacy protection requiring segment and/or the required degree of similarity in ranking to the original enhanced privacy protection requiring segment) and the transaction indexes for these segments may be averaged with or otherwise combined with the initial masked transaction index to generate a double-masked transaction index. This process may be repeated to generate a triple masked transaction index, a quadruple masked transaction index, etc., until any confidential data in one or more enhanced privacy protection requiring segments or groups of data is deemed to be sufficiently obscured (e.g., due to having greater than the threshold number of unique customers and/or unique merchants and/or or when less than a threshold portion of the total number or amount of transactions is accountable to single merchant (or a threshold number of merchants), as discussed above. In some non-limiting embodiments, after a threshold number of iterations (e.g., after 1, 2, or 3, etc. iterations), geographic identification system 102 may be configured to stop using analogous segments to generate the masked transaction indexes and, instead, to replace the transaction indexes for the enhanced privacy protection requiring segments with predetermined placeholder values or to simply not provide any data regarding those segments for generating the visual representation. In this way, data for certain extremely sensitive segments or groups of segments may be completely removed from the visual representation and/or the data upon which it is based.

With reference to FIGS. 4A-F, provided is a non-limiting embodiment of an implementation of a process for electronically generating a privacy-protected map for selectively displaying information commercial activity in a geographic area.

Figure 4A:
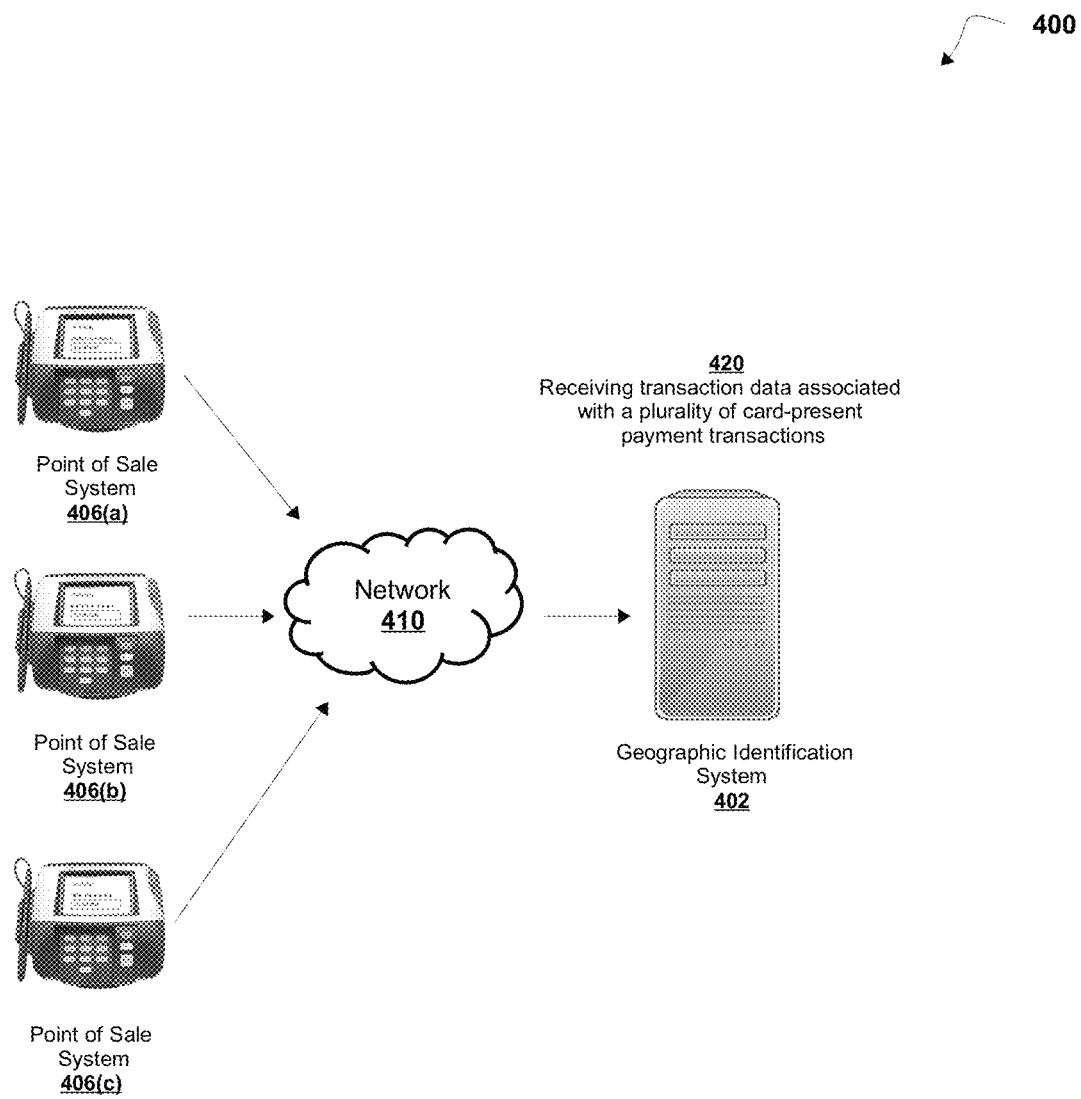
FIGS. 4A-4F depict a diagram of an implementation of a process for electronically generating a privacy-protected map for selectively displaying information commercial activity in a geographic area.

With reference to FIG. 4A, at step 420, in the non-limiting embodiment shown, geographic identification system 402 receives transaction data regarding card-present payment transactions from a plurality of point-of-sale systems 406(*a, b, c*) associated with various merchants in various locations via network 410.

Figure 4B:
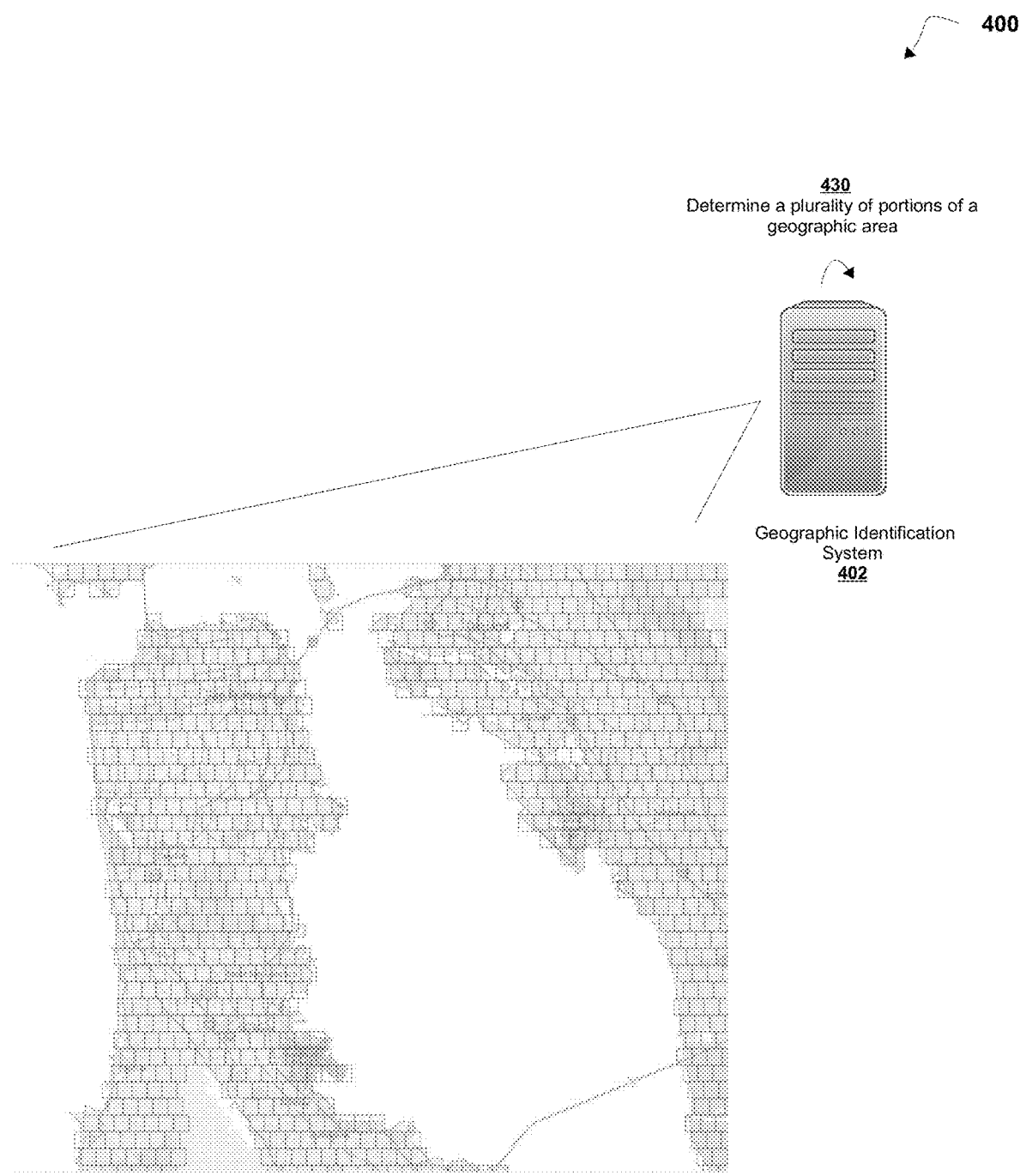

With reference to FIG. 4B, at step 430, in the non-limiting embodiment shown, a geographic area of interest is identified (e.g., in response to a user input) and geographic identification system 402 retrieves map data (e.g., via network 410 or from an internal database) regarding the geographic area of interest and generates a map of the geographic area of interest having a grid overlayed thereon, which may or may not be displayed on a graphical user interface. Each of a plurality of subunits of the grid (e.g., each grid square) is designated as one of a plurality of segments of the geographic area for further analysis.

For example, in the non-limiting embodiment shown in FIG. 4B, a map of a portion of the U.S. city of San Francisco has been generated having a grid overlayed thereon, where each grid square has the dimensions of 0.5×0.5 miles. In the non-limiting embodiment shown, each grid square that is not entirely over water is designated as a segment of the geographic area for further analysis.

Figure 4C:
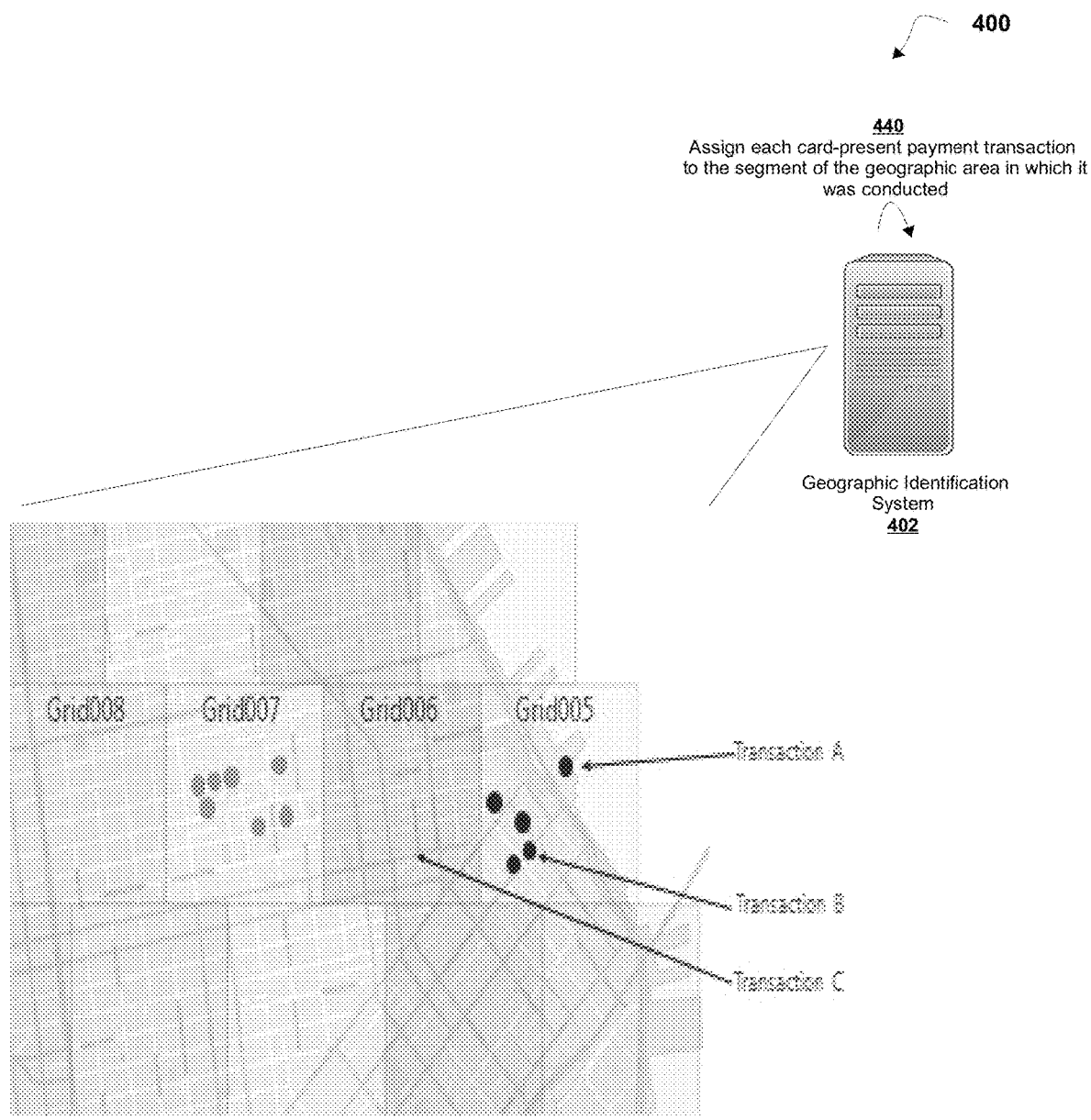

With reference to FIG. 4C, in the non-limiting embodiment shown, at step 440, geographic identification system 402 assigns each of a plurality of card-present payment transactions to the segment of the geographic area in which it was conducted based on the transaction data that was received at step 420. For example, in the non-limiting embodiment shown, Transactions A, B, and C represent card-present payment transactions that were conducted using point-of-sale systems 406(*a*), (*b*), and (*c*) shown in FIG. 4A, respectively. Geographic identification system 402 determines a location (e.g., an address) where each of the point-of-sale systems is located based on the transaction data obtained therefrom (e.g., based on merchant data that is received as part of the transaction data) and assigns each card-present transaction to the location where the transaction was conducted. Each transaction is then assigned to an appropriate subunit based on the grid square it falls in on the map. For example, in the non-limiting embodiment shown, Transactions A and B were conducted using point of sale systems 406(*a*) and (*b*), respectively, which are located in Grid005 on the map and, are thus, assigned to the segment associated with grid square Grid005. Similarly, Transaction C was conducted using point of sale system 406(*c*), which is located in Grid006 on the map, and, thus, this transaction is assigned to the segment associated with grid square Grid005.

Figure 4D:
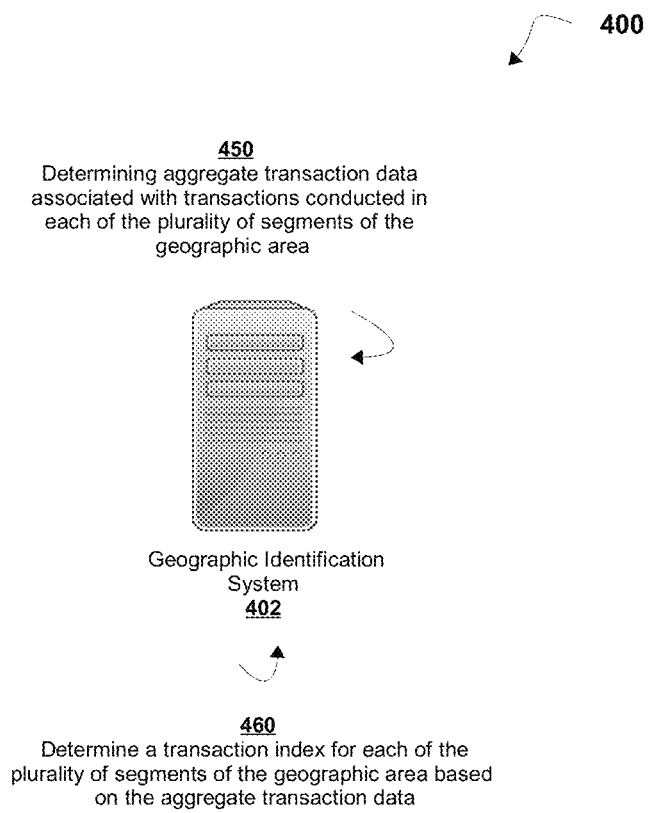

With reference to FIG. 4D, at step 450, in the non-limiting embodiment shown, geographic identification system 402 aggregates the number of transactions that were conducted in each of the plurality of segments of the geographic area designated in step 440.

With continued reference to FIG. 4D, at step 460, in the non-limiting embodiment shown, geographic identification system 402 proceeds to determine a transaction index for each of the plurality of segments that have been identified. For example, geographic identification system 402 may generate the transaction index may generated, using the following formula:

$$T=((a/c)/(b/d))*((\text{sqrt}(c))/(\text{sqrt}(e)))+1-((\text{sqrt}(c))/(\text{sqrt}(e)))$$

where:

T=transaction index for a segment for a time interval;

a=number of transactions involving customers who have previously engaged in transactions with the requesting user in the segment during the time interval;

b=number of transactions involving customers who have previously engaged in transactions with the requesting user in the entire geographic area (i.e., in all segments combined) during the time interval;

c=total number of transactions in the segment during the time interval;

d=total number of transactions in the geographic area during the time interval; and e=the total number of transactions of the segment having the maximum total number of transactions among all segments in the geographic area during the time interval.

Figure 4E:
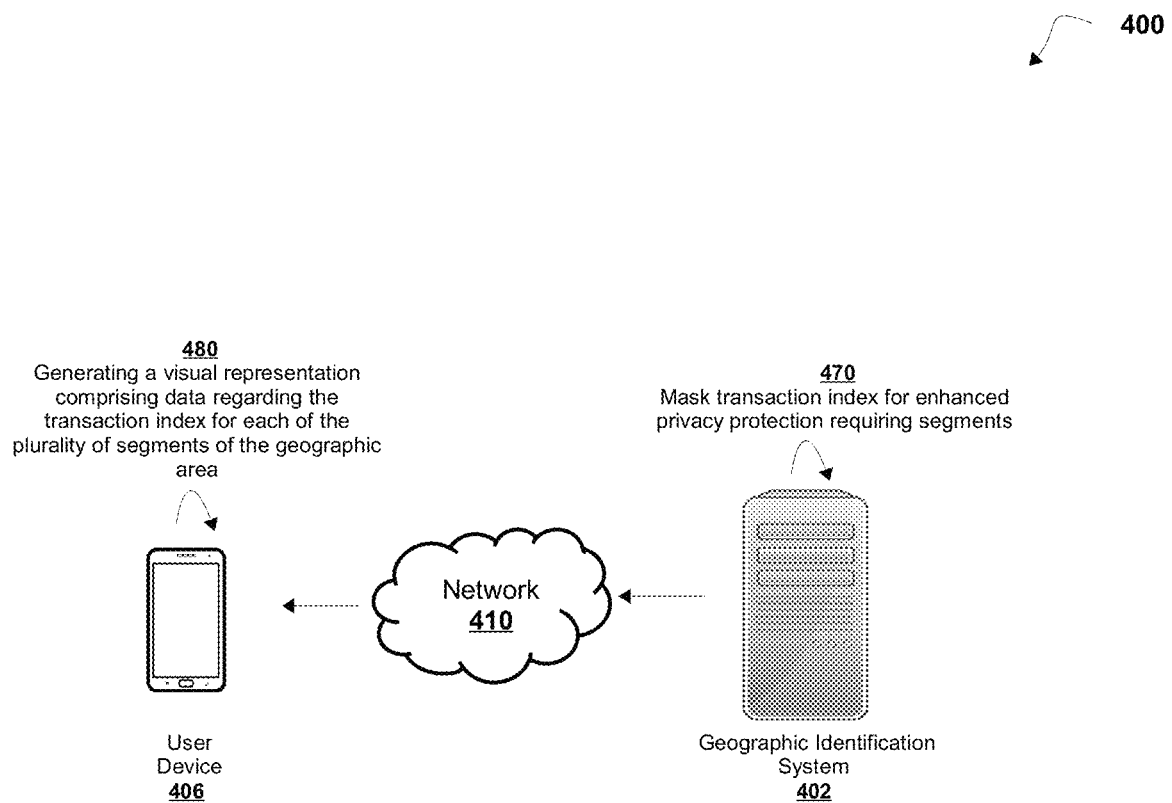

With reference to FIG. 4E, at step 470, in the non-limiting embodiment shown, geographic identification system 402 identifies enhanced privacy protection requiring segments and masks the transaction index for these segments. In one non-limiting embodiment, this may be accomplished by geographic identification system 402 using the following steps:

1. all segments having fewer than a threshold number of unique merchants (e.g., 5) or a threshold number of unique customers (e.g., 10) are removed, and no data for these segments is further analyzed or provided for generating the visual representation;

2. an initial transaction index is determined for each of the remaining segments based on the total number of transactions conducted therein;

3. any of the analyzed segments where a single merchant is involved in more than 50% of the total transactions therein is identified as requiring enhanced privacy protection;

4. all of the analyzed segments of the geographic area are ranked in terms of the number transactions that have been conducted therein and are assigned a percentile ranking;

5. for each enhanced privacy protection requiring segment, the transaction index is averaged with the transaction index for all other segments of the geographic region which are within one percentile of that segment, which are designated as corresponding segments, and the transaction index is replaced with this value as a masked transaction index;

6. the enhanced privacy protection requiring segment and the corresponding segments are then evaluated as a group to determine whether a single merchant is involved in more than 50% of the combined number of total transactions conducted therein; if not, then the masked transaction index is used as-is for the enhanced privacy protection requiring segment, if yes, then the system proceeds to step 7;

7. if a single merchant is involved in more than 50% of the combined number of total transactions conducted in the group of segments (i.e., the enhanced privacy protection requiring segment and the analogous segments), step 5 is repeated, but with all segments of the geographic region which are within two percentiles of the enhanced privacy protection requiring segment being designated as corresponding segments to generate a double-masked transaction index, and then step 6 is repeated using the new, larger set of corresponding segments, followed by step 8, below;

8. if no single merchant is involved in more than 50% of the combined number of total transactions conducted in the enhanced privacy protection requiring segment and the corresponding segments used in generating the double-masked transaction index, then this value is substituted for the initial transaction index of the enhanced privacy protection requiring segment; otherwise, the data for the enhanced privacy protection requiring segment is removed from the data for generating the visual representation.

Table 1, below shows a non-limiting example of potential data for the four grid squares that are labeled in FIG. 4C. It is noted that this table does not show all segments of the entire designated geographic area, which, in this example, includes many more segments (i.e., grid squares) that are not shown, but rather is intended to show a non-limiting example of how a transaction index may be masked among a few potential segments.

TABLE 1

| A<br>Segment<br>Identification<br>Number | B<br>Number of<br>merchants | C<br>% of<br>Transactions<br>involving<br>Largest single<br>merchant | D<br>Initial<br>Transaction<br>Index | E<br>Percentile<br>Rank (Among<br>Entire<br>Geographic<br>area) | F<br>Masked<br>Transaction<br>Index |
|---|---|---|---|---|---|
| Grid005 | 5 | 78% | 0.55909596 | 51 | 0.553925295 |
| Grid006 | 6 | 23% | 0.54875463 | 50 | N/A |
| Grid007 | 7 | 25% | 0.25155021 | 45 | N/A |
| Grid008 | 0 | 0% | 0 | 0 | N/A |

With reference to Table 1, it can be seen that the segment identified as Grid005 has a single merchant that was involved in 78% of the transactions conducted therein. Accordingly, in this non-limiting example, Grid005 is determined as requiring enhanced privacy protection because a single merchant is involved in more than a threshold portion (e.g., 50%) of the combined number of total transactions conducted in this segment. Segments Nos. Grid006, Grid007, and Grid008 do not meet this threshold and, thus, are not designated as requiring enhanced privacy protection. Therefore, the transaction index for these segments is not masked, and the initial transaction index is provided for these segments for use in generating the visual representation.

For Grid005, the transaction index is masked. In this non-limiting example, Grid006 is identified as an analogous segment to Grid005 because it is within one percentile ranking thereof, among the entire designated geographic area. Accordingly, the initial transaction index for Grid005 is averaged with the initial transaction index of Grid006 to generate a masked transaction index for Grid005. This masked transaction index is then utilized for generating the visual representation.

With continued reference to FIG. 4E, at step 480, in the non-limiting embodiment shown, user device 406 generates a visual representation comprising data regarding the transaction index for each of the plurality of segments of the geographic area. As discussed above, in the non-limiting embodiment shown, user device 406 does not have access to the initial transaction index for any of the enhanced privacy protection requiring segments or to any of the raw data that was used for generating the initial transaction indexes (e.g., the transaction data and/or aggregate transaction data). Instead, user device 406 is provided only with masked transaction indexes for any enhanced privacy protection requiring segments and generates the visualization using the masked transaction indexes for these segments.

Figure 4F:
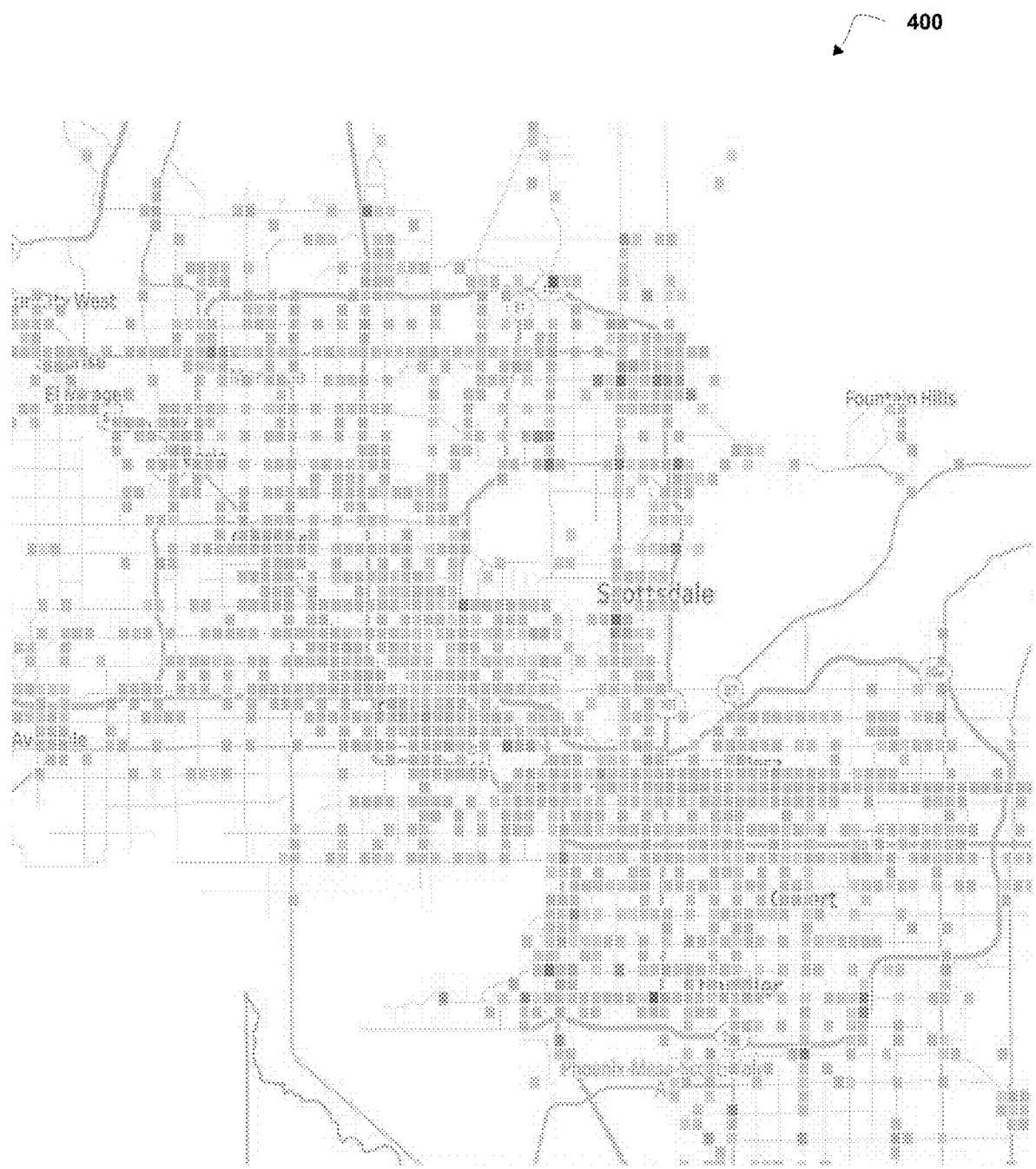

With reference to FIG. 4F, FIG. 4F shows an exemplary visual representation generated in accordance with process 400 in accordance with a non-limiting embodiment of the invention. As can be seen in FIG. 4F, a map of a geographic area has been generated with a grid overlayed thereon dividing the geographic area into a plurality of segments (i.e., grid squares). In the non-limiting example shown, the transaction index or masked transaction index for each segment is represented by the level of shading contained within each grid square, such that segments having a high transaction index (or masked transaction index) are displayed with a darker shading and segments having a low transaction index (or masked transaction index) are displayed with a lighter shading. As such, a user may utilize this map in identifying areas where a high number of card-present transactions have been conducted (i.e., in the darker shaded regions), and this data may be useful for the user, for example, in determining where to place a new storefront and/or advertising materials.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for selectively displaying information regarding commercial activity in a geographic area, comprising:

receiving, by at least one processor, data regarding a plurality of card-present payment transactions that have been conducted in the geographic area during a time interval;

determining, by at least one processor, a plurality of segments of the geographic area by generating a dynamic grid overlayed on a visual representation of the geographic area, the dynamic grid comprising a plurality of subunits, each subunit corresponding to one of the plurality of segments;

assigning, by at least one processor, each of the plurality of card-present payment transactions to the segment corresponding to the segment of the geographic area in which the card-present payment transaction was conducted;

determining, by at least one processor, aggregate transaction data for each of the plurality of segments based on data regarding the card-present payment transactions that have been assigned to that segment;

generating, by at least one processor, a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof;

determining, by at least one processor, for at least one segment of the plurality of segments of the geographic area, data regarding a total number and/or total amount of transactions in which each of at least one merchant located in the at least one segment was involved during the time interval;

determining, by at least one processor, whether the at least one segment is an enhanced privacy protection requiring segment based on determining whether a fraction of the aggregate transaction data of the at least one segment that is attributable to at least one of the at least one merchant exceeds a threshold;

identifying, by at least one processor, for each enhanced privacy protection requiring segment, at least one analogous segment, the at least one analogous segment comprising a segment of the geographic area having at least one of the following characteristics: a predetermined geographic relationship with the enhanced privacy protection requiring segment, an aggregate transaction data falling within a specified range of the aggregate transaction data of the enhanced privacy protection requiring segment, or any combination thereof;

generating, by at least one processor, the visual representation comprising data regarding the transaction index of at least one of the plurality of segments, wherein generating the visual representation comprising data regarding the transaction index of at least one of the plurality of segments comprises displaying, for each enhanced privacy protection requiring segment and each analogous segment for that enhanced privacy protection requiring segment, a masked transaction index, the masked transaction index being generated based on an average of the transaction indexes of the enhanced privacy protection requiring segment and the transaction indexes of the at least one analogous segment;

adjusting, by at least one processor, a size of each subunit of the dynamic grid overlayed on the visual representation of the geographic area in response to a user input to the visual representation to determine a plurality of re-sized segments of the geographic area;

recalculating, by at least one processor, a re-sized transaction index for each re-sized segment of the plurality of re-sized segments, the re-sized transaction index for each re-sized segment being generated based on a comparison of the aggregate transaction data of that re-sized segment with at least one of the following: aggregate transaction data of at least one different re-sized segment of the plurality of re-sized segments, at least one predetermined metric, or any combination thereof;

determining, by at least one processor, for at least one re-sized segment of the plurality of re-sized segments of the geographic area, data regarding a total number and/or total amount of transactions in which each of at least one merchant located in the at least one re-sized segment was involved during the time interval;

determining, by at least one processor, whether the at least one re-sized segment is an enhanced privacy protection requiring re-sized segment based on determining whether the fraction of the aggregate transaction data of the at least one re-sized segment that is attributable to at least one of the at least one merchant exceeds the threshold;

identifying, by at least one processor, for each enhanced privacy protection requiring re-sized segment, at least one analogous re-sized segment, the at least one analogous re-sized segment comprising a re-sized segment of the geographic area having at least one of the following characteristics: a predetermined geographic relationship with the enhanced privacy protection requiring re-sized segment, an aggregate transaction data falling within a specified range of the aggregate transaction data of the enhanced privacy protection requiring re-sized segment, or any combination thereof; and generating, by at least one processor, an updated visual representation comprising data regarding the re-sized transaction index of at least one of the plurality of re-sized segments, wherein generating the updated visual representation comprising data regarding the re-sized transaction index of at least one of the plurality of re-sized segments comprises:
  displaying, for each enhanced privacy protection requiring re-sized segment and each analogous re-sized segment for that enhanced privacy protection requiring re-sized segment, a re-sized masked transaction index, the re-sized masked transaction index being generated based on an average of the re-sized transaction indexes of the enhanced privacy protection requiring re-sized segment and the re-sized transaction indexes of the at least one analogous re-sized segment, wherein each re-sized segment of the plurality of re-sized segments includes a larger geographic area than each segment of the plurality of segments, wherein one or more re-sized segments of the plurality of segments include a same geographic area as one or more enhanced privacy protection requiring segments of the plurality of segments, and wherein the displayed updated visual representation for the one or more re-sized segments includes the re-sized transaction index for that re-sized segment without masking.

2. The method of claim 1, wherein the visual representation is generated by at least one second processor, the at least second processor not having access to the aggregate transaction data or the data regarding a plurality of card-present payment transactions that have been conducted in the geographic area.

3. The method of claim 2, wherein the at least one second processor does not have access to the transaction index for the enhanced privacy protection requiring segments.

4. The method of claim 1, further comprising:
  receiving data regarding a plurality of customers that have previously completed transactions with a user; and
  excluding, from the plurality of card-present payment transactions, transactions that do not involve at least one of the plurality of customers that have previously completed transactions with the user.

5. The method of claim 1, wherein generating the visual representation comprising data regarding the transaction index of at least one of the plurality of segments comprises displaying, for each enhanced privacy protection requiring segment, data regarding an at least double masked transaction index, the at least double masked transaction index being generated by:
  (i) generating a masked transaction index based on an average of the transaction indexes of the enhanced privacy protection requiring segment and the transaction indexes of the at least one analogous segment,
  (ii) evaluating the enhanced privacy protection requiring segment and the at least one analogous segment as a group of segments to determine whether a single merchant is involved in more than a threshold percentage of a combined number of total transactions conducted therein,
  (iii) in response to determining the single merchant is involved in more than the threshold percentage of the combined number of total transactions conducted in the group of segments, identifying, for the enhanced privacy protection requiring segment, the at least one analogous segment, the at least one analogous segment comprising a segment of the geographic area having at least one of the following characteristics: a more distant predetermined geographic relationship with the enhanced privacy protection requiring segment than a previous predetermined geographic relationship, an aggregate transaction data falling within a greater specified range of the aggregate transaction data of the enhanced privacy protection requiring segment than a previous specified range, or any combination thereof,
  (iv) generating the at least double masked transaction index based on the average of the transaction indexes of the enhanced privacy protection requiring segment and the transaction indexes of the at least one analogous segment,
  (v) repeating steps (ii)-(iv) until determining that no single merchant is involved in more than the threshold percentage of the combined number of total transactions conducted in the group of segments, and
  (vi) in response to determining that no single merchant is involved in more than the threshold percentage of the combined number of total transactions conducted in the group of segments, substituting the at least double masked transaction index for the transaction index of the enhanced privacy protection requiring segment.

6. A system for selectively displaying information regarding activity in a geographic area, comprising at least one processor configured or programmed to:
  receive data regarding a plurality of card-present payment transactions that have been conducted in the geographic area during a time interval;

determine a plurality of segments of the geographic area by generating a dynamic grid overlayed on a visual representation of the geographic area, the dynamic grid comprising a plurality of subunits, each subunit corresponding to one of the plurality of segments;

assign each of the plurality of card-present payment transactions to the segment corresponding to the segment of the geographic area in which the card-present payment transaction was conducted;

determine aggregate transaction data for each of the plurality of segments based on data regarding the card-present payment transactions that have been assigned to that segment;

generate a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof;

determine for at least one segment of the plurality of segments of the geographic area, data regarding a total number and/or total amount of transactions in which each of at least one merchant located in the at least one segment was involved during the time interval;

determine whether the at least one segment is an enhanced privacy protection requiring segment based on determining whether a fraction of the aggregate transaction data of the at least one segment that is attributable to at least one of the at least one merchant exceeds a threshold;

identify, for each enhanced privacy protection requiring segment, at least one analogous segment, the at least one analogous segment comprising a segment of the geographic area having at least one of the following characteristics: a predetermined geographic relationship with the enhanced privacy protection requiring segment, an aggregate transaction data falling within a specified range of the aggregate transaction data of the enhanced privacy protection requiring segment, or any combination thereof;

generate the visual representation comprising data regarding the transaction index of at least one of the plurality of segments, wherein generating the visual representation comprising data regarding the transaction index of at least one of the plurality of segments comprises displaying, for each enhanced privacy protection requiring segment and each analogous segment for that enhanced privacy protection requiring segment, a masked transaction index, the masked transaction index being generated based on an average of the transaction indexes of the enhanced privacy protection requiring segment and the transaction indexes of the at least one analogous segment;

adjust a size of each subunit of the dynamic grid overlayed on the visual representation of the geographic area in response to a user input to the visual representation to determine a plurality of re-sized segments of the geographic area;

recalculate a re-sized transaction index for each re-sized segment of the plurality of re-sized segments, the re-sized transaction index for each re-sized segment being generated based on a comparison of the aggregate transaction data of that re-sized segment with at least one of the following: aggregate transaction data of at least one different re-sized segment of the plurality of re-sized segments, at least one predetermined metric, or any combination thereof;

determine for at least one re-sized segment of the plurality of re-sized segments of the geographic area, data regarding a total number and/or total amount of transactions in which each of at least one merchant located in the at least one re-sized segment was involved during the time interval;

determine whether the at least one re-sized segment is an enhanced privacy protection requiring re-sized segment based on determining whether the fraction of the aggregate transaction data of the at least one re-sized segment that is attributable to at least one of the at least one merchant exceeds the threshold;

identify for each enhanced privacy protection requiring re-sized segment, at least one analogous re-sized segment, the at least one analogous re-sized segment comprising a re-sized segment of the geographic area having at least one of the following characteristics: a predetermined geographic relationship with the enhanced privacy protection requiring re-sized segment, an aggregate transaction data falling within a specified range of the aggregate transaction data of the enhanced privacy protection requiring re-sized segment, or any combination thereof; and generate an updated visual representation comprising data regarding the re-sized transaction index of at least one of the plurality of re-sized segments, wherein generation of the updated visual representation comprising data regarding the re-sized transaction index of at least one of the plurality of re-sized segments comprises:

displaying, for each enhanced privacy protection requiring re-sized segment and each analogous re-sized segment for that enhanced privacy protection requiring re-sized segment, a re-sized masked transaction index, the re-sized masked transaction index being generated based on an average of the re-sized transaction indexes of the enhanced privacy protection requiring re-sized segment and the re-sized transaction indexes of the at least one analogous re-sized segment, wherein each re-sized segment of the plurality of re-sized segments include a larger geographic area than each segment of the plurality of segments, wherein one or more re-sized segments of the plurality of segments include a same geographic area as one or more enhanced privacy protection requiring segments of the plurality of segments, and wherein the displayed updated visual representation for the one or more re-sized segments includes the re-sized transaction index for that re-sized segment without masking.

7. The system of claim 6, wherein the at least one processor comprises at least one second processor configured or programmed to generate the visual representation, wherein the at least second processor does not have access to the aggregate transaction data or the data regarding a plurality of card-present payment transactions that have been conducted in the geographic area.

8. The system of claim 7, wherein the at least second processor does not have access to the transaction index for the enhanced privacy protection requiring segments.

9. The system of claim 6, wherein the at least one processor is further configured or programmed to:

receive data regarding a plurality of customers that have previously completed transactions with a user; and exclude, from the plurality of card-present payment transactions, transactions that do not involve at least one of the plurality of customers that have previously completed transactions with the user.

10. A computer program product for selectively displaying information regarding activity in a geographic area, the computer program product comprising at least one non-transitory computer-readable medium comprising program instructions that, when executed by at least one processor, cause the at least one processor to:

receive data regarding a plurality of card-present payment transactions that have been conducted in the geographic area during a time interval;

determine a plurality of segments of the geographic area by generating a dynamic grid overlayed on a visual representation of the geographic area, the dynamic grid comprising a plurality of subunits, each subunit corresponding to one of the plurality of segments;

assign each of the plurality of card-present payment transactions to the segment corresponding to the segment of the geographic area in which the card-present payment transaction was conducted;

determine aggregate transaction data for each of the plurality of segments based on data regarding the card-present payment transactions that have been assigned to that segment;

generate a transaction index for each segment of the plurality of segments, the transaction index for each segment being generated based on a comparison of the aggregate transaction data of that segment with at least one of the following: aggregate transaction data of at least one different segment of the plurality of segments, at least one predetermined metric, or any combination thereof;

determine, for at least one segment of the plurality of segments of the geographic area, data regarding a total number and/or total amount of transactions in which each of at least one merchant located in the at least one segment was involved during the time interval;

determine whether the at least one segment is an enhanced privacy protection requiring segment based on determining whether a fraction of the aggregate transaction data of the at least one segment that is attributable to at least one of the at least one merchant exceeds a threshold;

identify, for each enhanced privacy protection requiring segment, at least one analogous segment, the at least one analogous segment comprising a segment of the geographic area having at least one of the following characteristics: a predetermined geographic relationship with the enhanced privacy protection requiring segment, an aggregate transaction data falling within a specified range of the aggregate transaction data of the enhanced privacy protection requiring segment, or any combination thereof;

generate the visual representation comprising data regarding the transaction index of at least one of the plurality of segments, wherein generating the visual representation comprising data regarding the transaction index of at least one of the plurality of segments comprises displaying, for each enhanced privacy protection requiring segment and each analogous segment for that enhanced privacy protection requiring segment, a masked transaction index, the masked transaction index being generated based on an average of the transaction indexes of the enhanced privacy protection requiring segment and the transaction indexes of the at least one analogous segment;

adjust a size of each subunit of the dynamic grid overlayed on the visual representation of the geographic area in response to a user input to the visual representation to determine a plurality of re-sized segments of the geographic area;

recalculate a re-sized transaction index for each re-sized segment of the plurality of re-sized segments, the re-sized transaction index for each re-sized segment being generated based on a comparison of the aggregate transaction data of that re-sized segment with at least one of the following: aggregate transaction data of at least one different re-sized segment of the plurality of re-sized segments, at least one predetermined metric, or any combination thereof;

determine for at least one re-sized segment of the plurality of re-sized segments of the geographic area, data regarding a total number and/or total amount of transactions in which each of at least one merchant located in the at least one re-sized segment was involved during the time interval;

determine whether the at least one re-sized segment is an enhanced privacy protection requiring re-sized segment based on determining whether the fraction of the aggregate transaction data of the at least one re-sized segment that is attributable to at least one of the at least one merchant exceeds the threshold;

identify for each enhanced privacy protection requiring re-sized segment, at least one analogous re-sized segment, the at least one analogous re-sized segment comprising a re-sized segment of the geographic area having at least one of the following characteristics: a predetermined geographic relationship with the enhanced privacy protection requiring re-sized segment, an aggregate transaction data falling within a specified range of the aggregate transaction data of the enhanced privacy protection requiring re-sized segment, or any combination thereof; and generate an updated visual representation comprising data regarding the re-sized transaction index of at least one of the plurality of re-sized segments, wherein generation of the updated visual representation comprising data regarding the re-sized transaction index of at least one of the plurality of re-sized segments comprises:

displaying, for each enhanced privacy protection requiring re-sized segment and each analogous re-sized segment for that enhanced privacy protection requiring re-sized segment, a re-sized masked transaction index, the re-sized masked transaction index being generated based on an average of the re-sized transaction indexes of the enhanced privacy protection requiring re-sized segment and the re-sized transaction indexes of the at least one analogous re-sized segment, wherein each re-sized segment of the plurality of re-sized segments include a larger geographic area than each segment of the plurality of segments, wherein one or more re-sized segments of the plurality of segments include a same geographic area as one or more enhanced privacy protection requiring segments of the plurality of segments, and wherein the displayed updated visual representation for the one or more re-sized segments includes the re-sized transaction index for that re-sized segment without masking.

11. The computer program product of claim 10, wherein the at least one processor comprises at least a second processor, wherein the at least one non-transitory computer-readable medium further comprises program instructions that, when executed by the at least second processor, cause the at least second processor to generate the visual representation,
- wherein the at least second processor does not have access to the aggregate transaction data or the data regarding a plurality of card-present payment transactions that have been conducted in the geographic area, and
- wherein the at least second processor does not have access to the transaction index for the enhanced privacy protection requiring segments.

12. The computer program product of claim 10, wherein the at least one non-transitory computer-readable medium further comprises program instructions that, when executed by the at least one processor, cause the at least one processor to:
- receive data regarding a plurality of customers that have previously completed transactions with a user; and
- exclude, from the plurality of card-present payment transactions, transactions that do not involve at least one of the plurality of customers that have previously completed transactions with the user.

* * * * *